(12) United States Patent
Mazumdar et al.

(10) Patent No.: US 10,592,727 B2
(45) Date of Patent: Mar. 17, 2020

(54) APPARATUS FOR AUTOMATED MONITORING OF FACIAL IMAGES AND A PROCESS THEREFOR

(71) Applicant: Centre for Development of Advanced Computing (C-DAC), Kolkata (IN)

(72) Inventors: Debasis Mazumdar, Kolkata (IN); Ritesh Mukherjee, Kolkata (IN)

(73) Assignee: Centre for Development of Advanced Computing, Bidhannagar, Kolkata (IN)

( * ) Notice: Subject to any disclaimer, the term of this patent is extended or adjusted under 35 U.S.C. 154(b) by 410 days.

(21) Appl. No.: 14/691,771

(22) Filed: Apr. 21, 2015

(65) Prior Publication Data

US 2016/0026855 A1    Jan. 28, 2016

(30) Foreign Application Priority Data

Jul. 28, 2014   (IN) .............................. 799/KOL/2014

(51) Int. Cl.
| | |
|---|---|
| *H04N 7/18* | (2006.01) |
| *G06K 9/00* | (2006.01) |
| *H04N 5/77* | (2006.01) |
| *H04N 5/232* | (2006.01) |
| *G08B 13/196* | (2006.01) |

(52) U.S. Cl.
CPC ..... *G06K 9/00228* (2013.01); *G06K 9/00268* (2013.01); *H04N 5/23219* (2013.01); *H04N 5/77* (2013.01); *H04N 7/181* (2013.01); *G08B 13/196* (2013.01)

(58) Field of Classification Search
CPC ........... G06K 9/00228; G06K 9/00268; G08B 13/196; H04N 5/23219; H04N 5/77; H04N 7/181

USPC ......................................................... 348/143
See application file for complete search history.

(56) References Cited

U.S. PATENT DOCUMENTS

| | | | | |
|---|---|---|---|---|
| 5,455,625 | A | * 10/1995 | Englander ............... | B60R 11/04 348/372 |
| 6,019,524 | A | * 2/2000 | Arbuckle ............... | F16M 11/10 248/346.06 |
| 2009/0010501 | A1 | * 1/2009 | Ogawa ............... | G06K 9/00248 382/118 |

(Continued)

OTHER PUBLICATIONS

Zavio F7210 2 Megapixel Day/Night WDR Box IP Camera, Zavio Inc 2011.*

*Primary Examiner* — William C Vaughn, Jr.
*Assistant Examiner* — Naod W Belai
(74) *Attorney, Agent, or Firm* — The Webb Law Firm

(57) ABSTRACT

Provided herein is an apparatus for automated monitoring of facial images. The apparatus includes a cabinet having at least one video capturing device for continuously capturing video. The apparatus also includes means for analyzing frames to identify human facial images and for cropping facial images with data and time information, if detected, and at least one means for instantaneously transmitting the cropped facial images with date and time to at least one predefined storage unit operating in an unattended mode. The predefined storage unit is operatively connected to the cabinet. The apparatus can be configured for headless startup by means of an in built application software. A process for automated monitoring of facial images for surveillance purposes in a monitoring apparatus is also provided.

19 Claims, 5 Drawing Sheets

(56) References Cited

U.S. PATENT DOCUMENTS

| | | | |
|---|---|---|---|
| 2010/0261961 A1* | 10/2010 | Scott | A61B 1/00193 600/111 |
| 2012/0307049 A1* | 12/2012 | Mimar | G08B 13/19676 348/143 |
| 2013/0050522 A1* | 2/2013 | Mineshita | G08B 13/19686 348/222.1 |
| 2013/0300866 A1* | 11/2013 | Kildevaeld, III | H04R 1/1033 348/143 |
| 2014/0063236 A1* | 3/2014 | Shreve | G06K 9/00228 348/143 |
| 2014/0063237 A1* | 3/2014 | Stone | H04N 7/181 348/143 |
| 2014/0139660 A1* | 5/2014 | Zhu | G06K 9/00369 348/143 |
| 2014/0198208 A1* | 7/2014 | Neufeld | G06F 3/005 348/143 |
| 2014/0294257 A1* | 10/2014 | Tussy | G06Q 10/00 382/118 |
| 2014/0320646 A1* | 10/2014 | Neufeld | G08B 13/19619 348/143 |
| 2014/0368629 A1* | 12/2014 | Lucet-Levannier | A45D 44/005 348/77 |
| 2015/0264322 A1* | 9/2015 | Ang | H04N 5/2251 348/143 |
| 2016/0006989 A1* | 1/2016 | Swanson | H04L 67/125 348/151 |

* cited by examiner

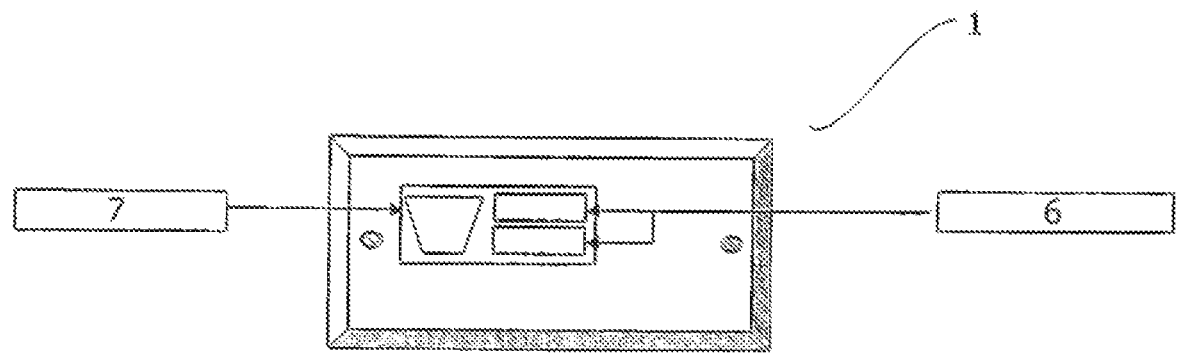
FIG 3
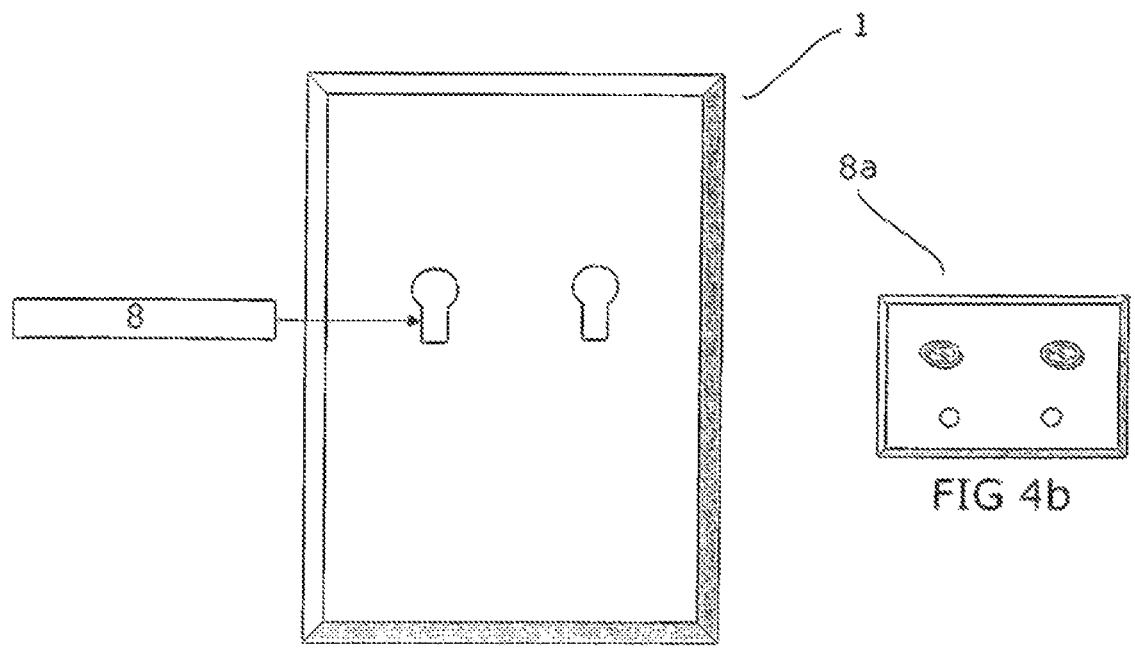
FIG 4a
FIG 4b

APPARATUS FOR AUTOMATED MONITORING OF FACIAL IMAGES AND A PROCESS THEREFOR

CROSS-REFERENCE TO RELATED APPLICATION

This application claims priority to Indian Patent Application No. 799/KOL/2014 filed Jul. 28, 2014, the disclosure of which is hereby incorporated in its entirety by reference.

BACKGROUND OF THE INVENTION

Field of the Invention

The present invention relates in general to an apparatus and a method for capturing facial images of the intruder, automatically for future reference on security issue. The apparatus can be a hidden device. More particularly, the invention relates to an apparatus and a method for instant detection of facial images, followed by offsite preservation of the same for future reference.

Description of Related Art

Due to change in the social structure, security of residential apartments, hotels as well as various public service centers involved in financial transaction has become seriously vulnerable. Today, people have become very busy as well as family structure becoming nuclear; as a result they are unable to spend quality time with their family and are unable to give time to their old parents.

There are also a sizable number of men and women who are forced to remain confined in their apartments and allowing the ill-intended invaders to take advantage of these situations. Almost every day the newspapers are flashed with news of burglary in apartments besides several crimes are reported in the hotels, guest houses, ATM counters and in similar locations where, potentialities exist for unwanted people to trespass and cause unwanted and unlawful activities. It will be understood to the readers that such vulnerable locations include corporate offices, libraries, educational institutions and the like and all these come within the purview of the present invention.

In most of the instances, the perpetrators are accompanied by known faces and to make the situation worst sometime the mission ends with brutal killing of the eye witness of the crime. Due to lack of evidence, most of the investigations get delayed or stopped without positive outcomes.

One of the most popular existing solutions is the close circuit television and similar kind of security arrangements/gadgets. These are implemented broadly in two ways (i) May be used to observe parts of a process (ii) A more advanced form of CCTV, utilizing digital video recorders (DVRs), provides recording for possibly many years, with a variety of quality and performance options and extra features.

Most CCTV systems records and store digital video and images to a Digital Video Recorder or in the case of IP cameras directly to a server, either on-site or offsite. The amount of data stored and the retention period of the video or pictures are subject to compression ratios, images stored per second, image size and duration of image retention before being overwritten.

Unfortunately these known implementations as discussed in the preceding paragraphs suffer from several drawbacks. In first type of implementation, the system demands manual intervention. Second type of implementation requires a huge amount of storage capacity followed by investigation with the help of intelligent manual inspection. At the same time, both of the known solutions demands adequate technical knowledge and cost involvement. That apart, the installations are prone to damage for tampering or destruction of data. This happens because, the unlawful and unwanted trespassers often destroy the evidences gathered by such security/surveillance gadgets which remain installed at the vulnerable locations, as discussed in the preceding paragraphs.

Accordingly, there is a long felt need for an apparatus which can automatically monitor facial images of possible trespassers at vulnerable locations, which uses minimum storage space, ensures easy installation and handling, can operate and preserve data without human intervention, as well as is easy to carry and can remain undetected at the place of installation.

Furthermore, there is also a need for such, an apparatus which can ensure that the data is not destroyed for future reference and correct investigation.

The present invention meets the abovementioned needs.

SUMMARY OF THE INVENTION

It is therefore an object of the present invention to propose an apparatus for automated monitoring of human facial images with minimum storage space to safely store the images without human intervention.

Another object of the present invention is to propose an apparatus for automated monitoring of human facial images with minimum storage space to safely store the images without human intervention, which can be easily installed, maintained, automatically operated, and used cost effectively.

It is still another object of the present invention to propose an apparatus for automated monitoring of human facial images with minimum storage space to safely store the images without human intervention, which can be easily hidden from the sight of possible unlawful and unwanted trespassers at vulnerable locations.

A further object of the present invention is to propose a process for automated monitoring of human facial images to identify the law-breaker.

How the foregoing objects are achieved will be clear from the following description. In this context it is clarified that the description provided is non-limiting and is only by way of explanation.

All through the specification including the claims, the words "apparatus", "cabinet", "wi-fi", "LAN cable" "network cable", "off-site", "investigation", "security", "surveillance", "storage unit", "slot", "facial image", "unattended mode", "device" are to be interpreted in the broadest sense of the respective terms and includes all similar items in the field known by other terms, as may be clear to persons skilled in the art. Restriction/limitation, if any, referred to in the specification, is solely by way of example and understanding the present invention.

Accordingly, the present invention in a first aspect provides an apparatus for automated monitoring of human facial images with minimum storage space to safely store the images without human intervention, which comprises a cabinet accommodating at least one video capturing device for continuously capturing videos; means for analyzing frames to identify human facial images and for cropping facial images with date and time information when detected; and means for immediately transmitting cropped facial images date and time to at least one predefined storage unit, to which the cabinet is operatively connected.

Preferably, the apparatus is configured to headless start up by means of an in built application software.

Preferably, the application software is enabled to analyze the captured video frame by frame using Haar classification image calculation mechanism, to recognize whether or not any face has been captured and to crop facial images when detected with capture date and time.

Preferably, the cabinet is an aluminum portable cabinet having a sliding tray arrangement for securing the cabinet to a hidden location, a frontal portion of said cabinet having a digital video camera and processing unit placed inside a metal housing, for continuously capturing videos and image acquisition.

Preferably the top portion of the cabinet has a power supply arrangement for running the apparatus including a slot for insertion of a micro SD card having the application software.

According to another preferred embodiment, the bottom portion of the cabinet is equipped with USB slots for connecting a wi-fi dongle for immediate transfer of cropped facial images with date and time to an off-site storage unit operating in unattended mode, for preserving captured images in said storage unit for investigation and analysis instantaneously or when required.

Alternatively, the bottom portion of the cabinet is equipped with a slot for RJ45 connector to attach LAN cable for transfer of cropped facial images to an off-site storage unit operating in unattended mode, for preserving captured images in said storage unit for investigation and analysis instantaneously or as and when required.

The present invention also provides a process for automated monitoring of facial images for surveillance purpose in an apparatus, comprising the steps of:
a) continuously capturing videos using a suitable video capturing device, b) analyzing frame by frame the captured video with the help of an application software using Haar classifier image calculation mechanism for identifying human facial images, cropping facial images when detected, and normalizing, and c) capturing date and time information of the detected facial images and immediately transmitting cropped facial images to a predefined off site storage unit operating in unattended mode, using a wi-fi dongle or network cable for investigation and analysis instantaneously or as and when required.

BRIEF DESCRIPTION OF THE DRAWINGS

The nature and scope of the present invention will be better understood from the accompanying drawings, which are by way of illustration of a preferred embodiment and not by way of any sort of limitation. In the accompanying drawings:

FIG. 3 is a bottom view of the apparatus of FIG. 1.

FIG. 4a is a rear view of the apparatus shown in FIGS. 1 to 3 with a fixing arrangement.

FIG. 4b is a view of an alternative fixing arrangement of the apparatus, other than what is shown in FIG. 4a.

DETAILED DESCRIPTION OF THE INVENTION

Following paragraphs provides a more detailed and non-limiting description of a preferred embodiment with reference to the accompanying drawings.

Figure 1:
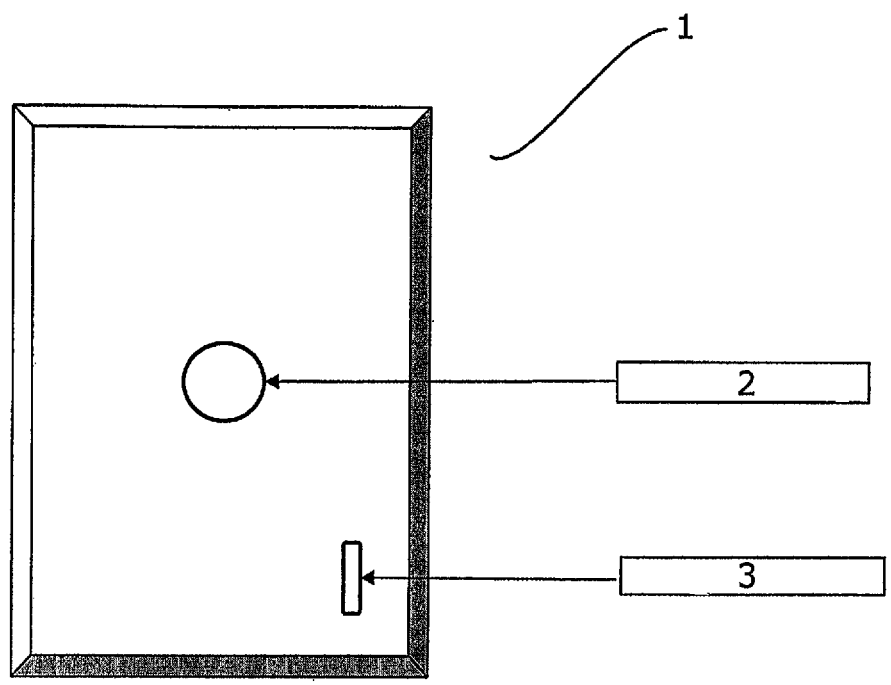
FIG. 1 is a front view of a preferred embodiment of the apparatus according to the present invention.

In all the figures, like reference numerals represent like features. Further, when in the following it is referred to "top portion", "bottom portion", "front portion", "rear portion" and similar terms, this is strictly referring to an orientation with reference to an orientation where the top portion of the FIG. 1 is the top portion of the apparatus. Furthermore, it should be understood by persons skilled in the art that the apparatus illustrated and described may take shapes and sizes, different from what are shown for the sake of explanation and understanding.

It should also be understood that the orientation/position of the various components of the apparatus and their numbers may be otherwise than shown in the drawings, without deviating from the principle of the invention.

At the outset, the structure of the apparatus is explained with reference to the various figures.

FIG. 1 is a front view of the apparatus. It should be clear from the figure that the apparatus comprises a cabinet (1), made of conductive material for operably attaching the necessary circuitry. There is an in built camera, the lens (2) of which is shown in FIG. 1. The apparatus has a very tiny size. For example, it can be 4" by 2.5" by 1.2". The camera may have the following specifications.

Camera resolution: 320×240 Brightness: 60

Normalized face size: 80×80

Required storage [1.84-3.38] KB per image

However, depending upon requirement, the cameral resolution may be 1920×1080.

Similarly, brightness may also vary between 0 and 100.

The camera capacity in the preferred embodiment shown and described is 30 frames/second.

FIG. 1 also shown a LED indicator opening (3) where LED (3a-best shown in FIG. 5) is pre-installed. The red light for instance will indicate failure of network connectivity, while the green light will indicate that the apparatus is working properly.

Figure 2:
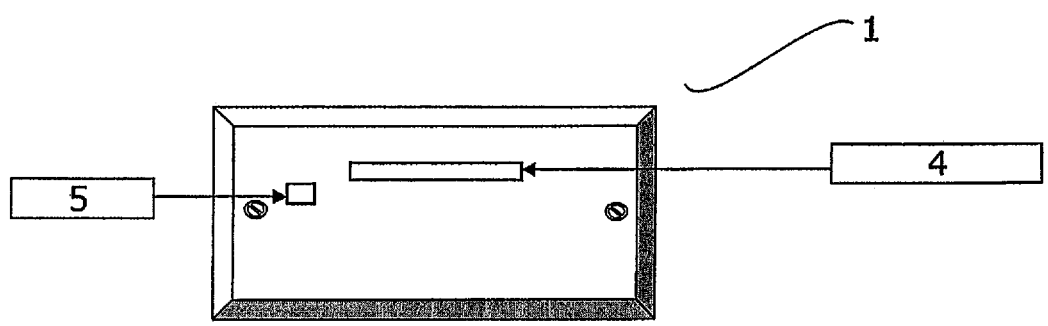
FIG. 2 is the top view of the apparatus of FIG. 1.

FIG. 2 is the top view of the cabinet (1). It shows a first slot (4) for insertion of a micro SD card which has an application software. This shall be further elaborated while describing the operation of the apparatus. FIG. 2 also shows a means (5) for attachment of power supply for running the apparatus. The developed apparatus may make use of say +5 volts regulated DC power supply with for example maximum 1000 mA current capacity. Power supply module can be say 5 v micro USB power supply arrangement.

FIG. 3 is the bottom view of the cabinet (1). It shows a second slot (6) for connecting wi-fi dongle for wireless communication and a third slot (7) for RJ45 connector to LAN cable in absence of wireless connectivity. An USB wi-fi dongle (not shown) is connected to the cabinet (1) to transmit data from the cabinet (1) to an offsite storage unit (100 best shown in FIG. 6). This storage unit (100) operates is unattended mode. The LAN cable is a standard network cable with RJ45 connector which is used for the purpose of data transfer between any portable gadget and an offsite storage in wired mode. This can be useful as an alternate arrangement in absence of reliable wireless arrangement. These are all elaborated further, while explaining the operations of the apparatus in the subsequent further, while explaining the operations of the apparatus in the subsequent paragraphs.

FIG. 4a is a rear view of the cabinet (1). It shows an arrangement (8) for securing the cabinet (1) to a hidden location where the unwanted and unlawful trespasser can not see it. The apparatus can be directly mounted on the fixing arrangement (8). Alternatively, as shown in FIG. 4b, there is a small sliding tray provided with the cabinet (1) and this arrangement can be fixed with the fixture (8) and the cabinet (1) is placed manually on the sliding arrangement.

Figure 5:
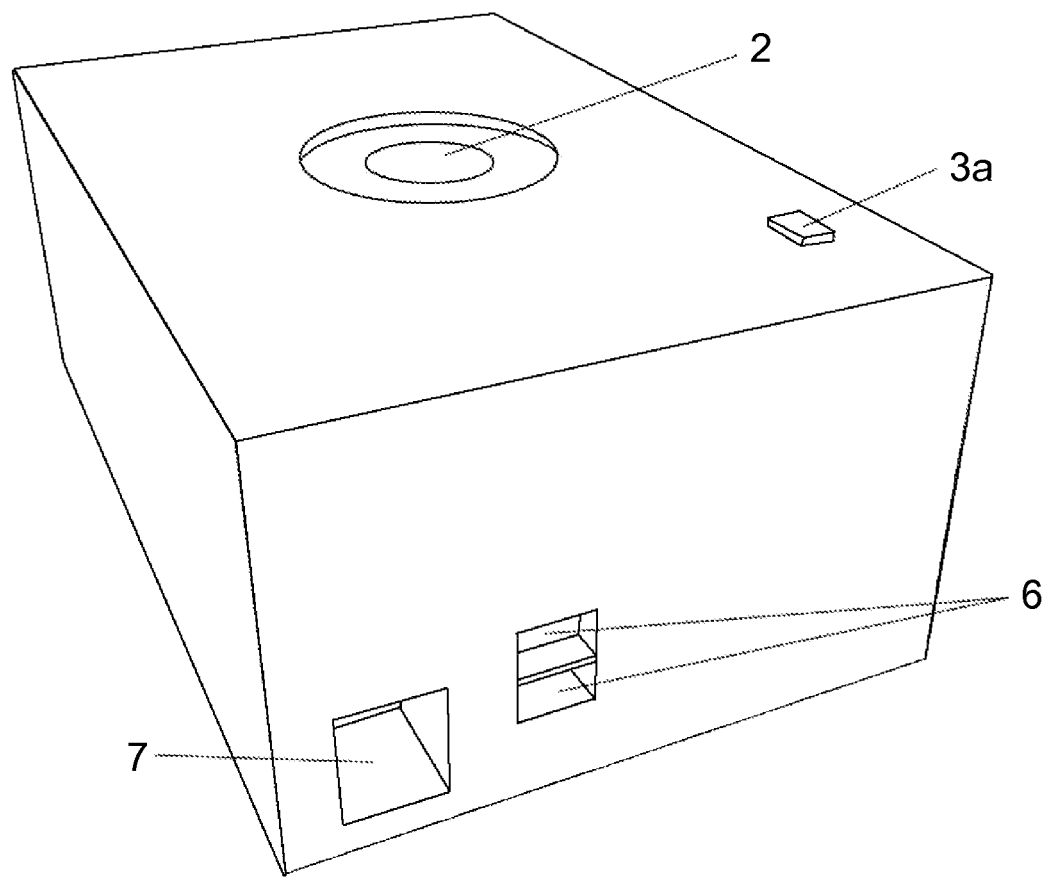
FIG. 5 is a perspective view of the apparatus shown in FIGS. 1 to 3.

FIG. 5 is a perspective view of the apparatus. This view clearly shows the possible three dimensional configuration of the apparatus. The in built camera lense position (2), the LED indicator (3a), the opening for LAN cable (7) and USB slots (6) for insertion of Wi-Fi dongle can also be seen.

Figure 6:
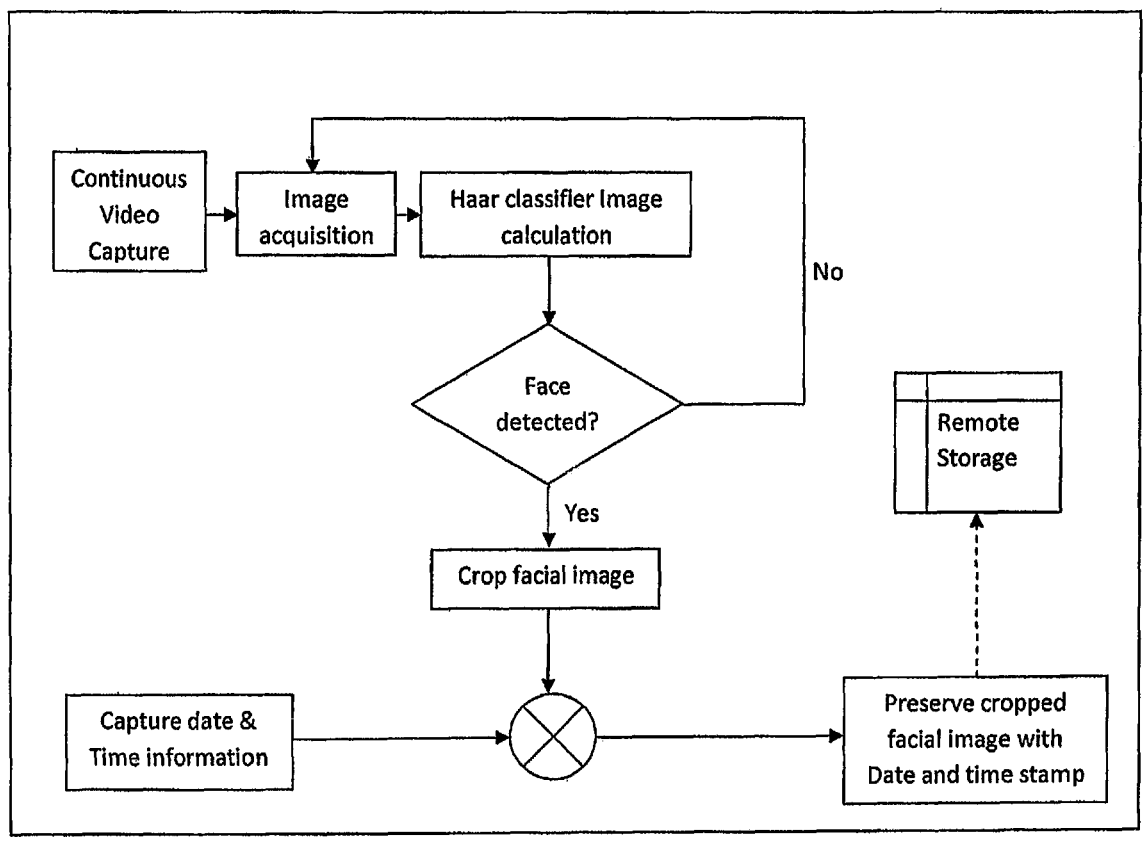
FIG. 6 is a flow chart illustrating how the process works.

FIG. 6 is a process flow chart and this is explained a little later.

Figure 7:
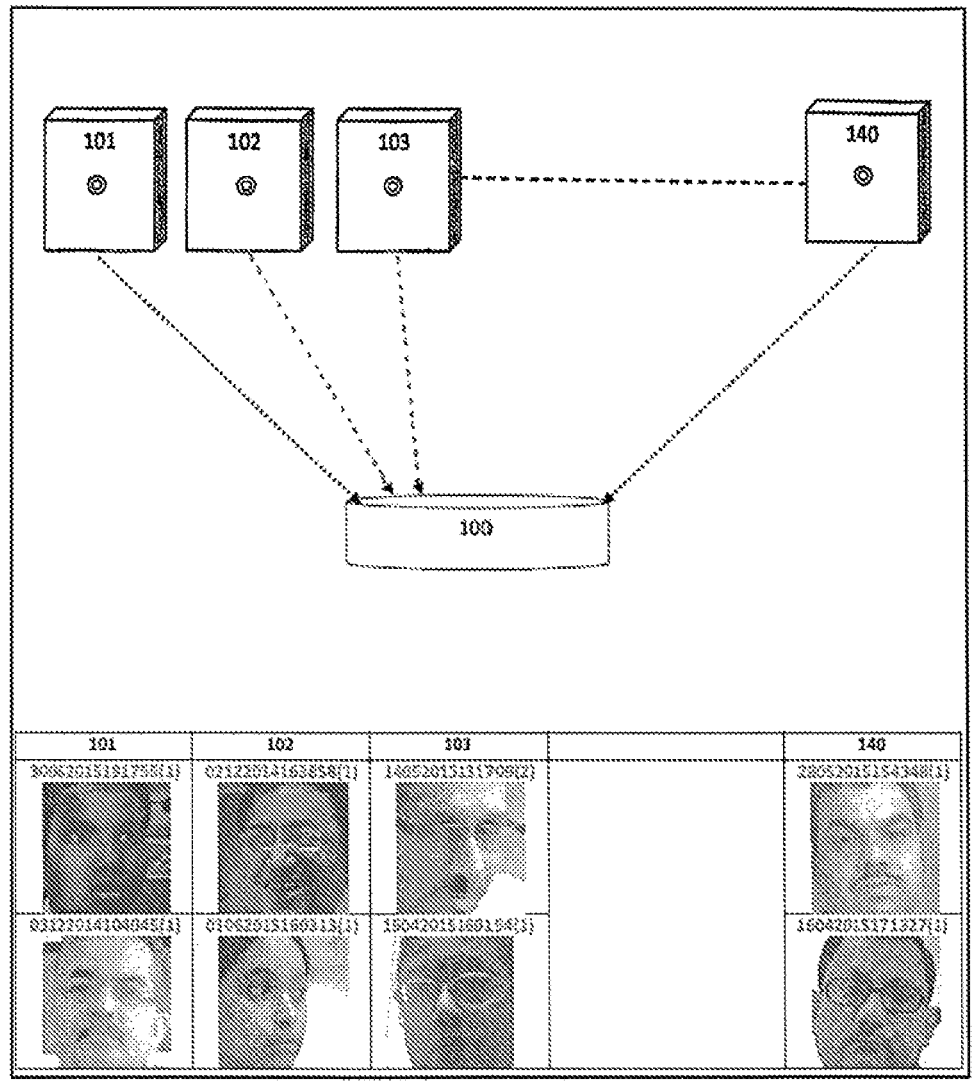
FIG. 7 is a schematic view of one possible application of the apparatus shown in FIGS. 1 to 4a, 4b.

FIG. 7 is an example for operating the apparatus illustrated in FIGS. 1 to 3, 4a, 4b. It shows a plurality of facial images (101, 102, 103, 104, . . . 140) of several persons who may or may not be trespassers. These images are all stored in an off site central storage unit (100), which works is unattended mode. It would be clear from the facial images (101, 102, 103 . . . 140) that all these have been cropped and the cropped images are stored in the storage unit (100) in unattended mode. This is an application specifically deployed for surveillance in residential complexes. The devices are all attached near eye-holes of each location intended to place under surveillance (not shown in detail). It should be understood that the devices may also be installed on any suitable location, from where faces of incoming persons can be clearly visible.

Having described the basic structure of the apparatus now its functioning is explained and for that purpose all the above figures are again referred to, without elaborating the structural part again.

It would be clear from the description of FIGS. 1 to 3, 4a and 4b, 5 in particular that the cabinet (1) is a small one and is portable. It is installed pretty easily on a fixture, at a hidden position, at a site which can be one of the various vulnerable sites as discussed hereinbefore. The installation is easy in as much as, referring to FIG. 4a, it can be easily secured to a fixture (not shown) by means of the securing arrangement (8). Alternatively, the sliding tray (8b) shown in FIG. 4b is secured to the fixture at the site of installation fairly easily and the cabinet (1) is placed manually on the sliding arrangement. Hence, installation and removal for maintenance is very easy and this corroborates the cost effectiveness of the cabinet (1).

The cabinet (1) is activated by means of a power supply as explained with reference to FIG. 2. If the LED indicator (3a best shown in FIG. 5) in the concerned slot (3) blinks green then the device is working properly. If it blinks red then there is failure of network connectively. It is within the scope of the present invention to run the device with emergency power source and also with non-conventional sources of power energy.

Now suppose possible trespassers or innocent persons come near the front portion of the cabinet (1) as shown in FIG. 1. Those persons are unable to see the cabinet (1) due to its very small size and hence can not destroy or distort it. The digital video camera lens (2) continuously captures videos.

Referring to FIG. 2 again the application software in the micro SD card located (4) at the top portion of the cabinet (1), now analyse the captured video, frame by frame using 'Haar classifier image calculation' mechanism to recognize whether any face has been captured or not. The apparatus will take no action until at least one human facial image is detected in the captured frame. Only on detection of the facial image or images, it crops the facial part of the captured image and captures the date and time. This explains why less storage space is required by the cabinet (1) to operate. It captures crops and normalizes, just the facial part of the image.

It should also be clear from the preceding paragraphs that while cropping of the facial image or images are done, the concerned persons are absolutely remain unaware that the facial part of their image is so cropped.

Once the cropping of a facial image and its normalizing are over, immediately the cropped facial image with date and time is transferred to an off-site storage unit (100-best shown in FIG. 7). This cropping goes on continuously each time a facial image is encouraged and detected. Referring to FIG. 3, the wi-fi dongle (not shown) positioned (6) at the bottom portion of the cabinet (1) immediately transmits a cropped facial image to the off site storage unit which is connected to the cabinet (1) through the wi-fi. This storage unit is unmanned and works in unattended mode.

Alternatively, a LAN cable may be deployed for connectivity with the offsite storage (100) and for this purpose the cabinet has a slot (7) for insertion of RJ45 connector to attach the LAN cable. This will function in the same manner as the wi-fi dongle in absence of wireless connectivity.

The process of transferring cropped facial images to the off-site storage unit (100) is continuous. It should be understood from these steps of cropping of facial images one after another and immediate transferring of those to an off-site storage unit (100) one after another, that the possible lawbreaker can not distort the data instantaneously, by damaging or destroying the cabinet (1) even if he or she is able to detect it.

In the event of any untoward incident, the facial images of the concerned location can be referred to and investigated either instantaneously or as and when required, because the data remains correct and absolutely undistorted.

From the functioning of the apparatus as described hereinbefore with reference to FIGS. 1 to 3, 4a, 4b it would be clear that the operation of the apparatus is pretty simple and does not involve too much technical deliberations. How the process works is also amply clear from such description.

The process of automated monitoring of human faces according to the present invention is now further clarified with reference to FIG. 6.

The first step involves continuously capturing videos. The second step is image acquisition. The third step is analyzing frame by frame of the captured video with the help of application software using Haar classifier image calculation mechanism for identifying human face images.

If no human facial image is detected, then the flow again goes back to the second step of image acquisition and the third step is repeated again and again till a facial image is detected. Then the fourth step comes into play and the application software undertakes cropping of the facial portion of the image and normalizing.

Thereafter, the fifth step involves capturing date and time information of the detected facial image and immediately, the cropped facial portion of the image is transmitted to a predefined off site storage unit (100), using a wi-fi dongle or network cable for investigation and analysis instantaneously or as and when required. The storage unit (100) needs no human intervention. This is also true for the operation of the entire apparatus and process. Human intervention is not required at all. The entire operation is automatic.

The application software initiates headless start up of the apparatus and controls the five steps as discussed above with reference to FIG. 6.

The process goes on again and again and innumerable facial images are stored in unattended mode.

FIG. 7 is a very common application of the apparatus of the present invention. The chosen deployment scenario is implementation of surveillance arrangement in a residential complex where different apartments are numbered 101, 102, 103 - - - 140 and so on. The device (not shown in this figure in details) is say installed near the eye-hole of each apartment. Alternatively, the devices are installed on any suitable location, from where faces of incoming persons will be clearly visible.

All the devices, capture visitors/intruders facial images and preserve the same with proper date and time stamp on off-site central storage (100) whose configuration is predefined. The images are all stored in an off-site storage device (100) operating in unattended mode. Furthermore, the concerned persons are not aware that their facial images are getting so preserved. The facial images (101, 102, 103 - - - 140) shown in FIG. 7, bear testimony to these aspects.

In the event of any untoward incident, the investigators can take effective and precise help from these facial images for proper investigation and to catch hold of the one or more unlawful trespassers who may have been responsible for the incident.

It can be understood from the description in the preceding paragraph that the device being small can be unnoticed by the intruder. In a worst scenario, even if the trespasser detects it and destroys it, prior to such destruction, his or her facial image reaches the off-site storage device. It should be understood that arrangements can be done to transfer the data to one or more secondary storage and so on once the memory of the concerned predefined storage device is full and all these are within the scope of the present invention.

Furthermore, the apparatus can be customized to work in dark mode or to work in absence of power supply with the help of emergency or unconventional power resources as known to persons skilled in the art and all these fall within the ambit of the present invention.

From the description hereinbefore it would be amply clear how all the objectives of the present invention are achieved.

Some of the non-limiting advantages of the present invention may be summarized as below:
a) Offsite data preservation in unattended mode through hidden device.
b) Data capture and data preservation units are physically well separated to reduce the risks of destruction of evidence.
c) Requirement of lesser amount of storage space.
d) User-friendly design for the ease of domestic application.
e) Lower implementation cost.
f) Headless implementation
g) Easy installation.

The present invention has been described with reference to some drawings and a preferred embodiment purely for the sake of understanding and not by way of any limitation and the present invention includes all legitimate developments within the scope of what has been described herein before and claimed in the appended claims.

We claim:

1. An apparatus for automated monitoring of facial images comprising:
   a box-shaped cabinet formed from a conductive material comprising a top portion, a bottom portion, side portions extending therebetween, and a first opening extending through one of the side portions;
   at least one video capturing device enclosed within the cabinet for continuously capturing videos comprising a lens mounted to and covering the first opening of the cabinet;
   at least one processing unit enclosed in the cabinet; and
   at least one transmitter operatively connected to the processing unit through a second opening of the cabinet,
   wherein the at least one processing unit is configured to:
      analyze frames of videos from the video capturing device frame by frame using Haar classifier image calculations applied to each frame captured by the video capturing device to detect a captured frame including a human facial image;
      when the captured frame including the human facial image is identified, generate a cropped and normalized version of the captured frame by removing portions of the frame other than the human facial image and resizing the version of the frame such that the human facial image conforms to a predetermined size;
      capture date and time information for the captured frame; and
      after the cropped and normalized version of the frame is generated, cause the at least one transmitter to automatically and instantaneously transmit the cropped and normalized version of the frame and the date and time information for the frame to at least one predefined storage unit operating in an unattended mode when network connectivity is present, and
   wherein the cabinet is operatively connected to the at least one predefined storage unit.

2. The apparatus as claimed in claim 1, wherein application software executed by the at least one processing unit causes said apparatus to perform a headless start up process.

3. The apparatus as claimed in claim 2, wherein the top portion of the cabinet has a power supply arrangement for operating the apparatus and a slot for insertion of a micro SD card having application software which can be executed by the at least one processing unit.

4. The apparatus as claimed in claim 2, wherein the second opening comprises USB slats on the bottom portion of the cabinet for connecting the at least one transmitter to the cabinet, wherein the transmitter comprises a wi-fi dongle for immediate transfer of one or mare of the cropped and normalized versions of the frames and the date and time information to an off-site storage unit operating in an unattended mode, for preserving captured images in said storage unit for investigation and analysis instantaneously or as and when required.

5. The apparatus as claimed in claim 1, wherein the cabinet has a sliding tray arrangement for securing the cabinet to a hidden location, and wherein the at least one video capturing device comprises an inbuilt digital video camera positioned in a frontal portion of said cabinet.

6. The apparatus as claimed in claim 1, wherein the top portion of the cabinet has a power supply arrangement for operating the apparatus and a slot for insertion of a micro SD card having application software which can be executed by the at least one processing unit.

7. The apparatus as claimed in claim 1, wherein the second opening comprises USB slots on the bottom portion of the cabinet for connecting the at least one transmitter to the cabinet, wherein the transmitter comprises a wi-fi dongle for immediate transfer of cropped facial images with date and time to an off-site storage unit operating in an unattended mode, for preserving captured images in said storage unit for investigation and analysis instantaneously or as and when required.

8. The apparatus as claimed in claim 1, wherein said apparatus is a surveillance device attached adjacent to an eye-hole of each location intended to be placed under surveillance, for capturing visitors'/possible intruders' facial images and for preserving those with a proper date and time stamp in the at least one predefined storage unit.

9. The apparatus as claimed in claim 1, wherein the video capturing device comprises a camera having a resolution of from 320×280 pixels to 1920×1080 pixels, and wherein the cropped and normalized version of the captured frame is 80×80 pixels.

10. The apparatus as claimed in claim 1, wherein a required storage for the cropped and normalized version of the captured frame is from 1.84 KB to 3.38 KB.

11. The apparatus of claim 1, wherein the at least one processing unit is configured to identify the captured frame including the human facial image without determining an identity of an individual in the captured frame.

12. The apparatus of claim 1, wherein the processing unit is configured to generate a date/time stamp from the captured date and time information, and wherein the date/time stamp is saved with the cropped and normalized version of the frame in the at least one predefined storage unit.

13. The apparatus of claim 12, wherein the at least one processing unit is configured to identify captured frames including multiple human facial images, and to index the multiple facial images according to prominence of the human facial images in the captured frames.

14. The apparatus of claim 13, wherein, for captured frames including multiple human facial images, the at least one processing unit is configured to generate the cropped and normalized version of the captured frame for each of the multiple facial images in the captured frames.

15. The apparatus of claim 14, wherein each of the generated cropped and normalized versions of the captured frame is saved with the date/time stamp generated by the at least one processing unit.

16. An apparatus for automated monitoring of facial images comprising:
a box-shaped cabinet formed from a conductive material comprising a top portion, a bottom portion, side portions extending therebetween, and a first opening extending through one of the side portions;
at least one video capturing device enclosed in the cabinet for continuously capturing videos comprising a lens mounted to and covering the first opening of the cabinet;
at least one processing unit enclosed in the cabinet; and
at least one transmitter operatively connected to the processing unit through a second opening of the cabinet,
wherein the at least one processing unit is configured to:
analyze frames of videos from the video capturing device frame by frame using Haar classifier image calculations applied to each frame captured by the video capturing device to detect a captured frame including a human facial image;
when the captured frame including the human facial image is identified, generate a cropped and normalized version of the captured frame by removing portions of the frame other than the human facial image and resizing the version of the frame such that the human facial image conforms to a predetermined size;
capture date and time information for the captured frame; and
after the cropped and normalized version of the frame is generated and when network connectivity is present, cause the at least one transmitter to automatically transmit in real time the cropped and normalized version of the frame and the date and time information for the frame to at least one predefined storage unit operating in unattended mode, and to which the cabinet is operatively connected, and
wherein the bottom portion of the cabinet is provided with a slot for an RJ45 connector to attach a LAN cable for transfer of the cropped and normalized version of the frame to an off-site storage unit in an unattended mode, and for preserving the cropped and normalized version of the frame in said off-site storage unit for investigation and analysis instantaneously or when required.

17. The apparatus as claimed in claim 16, wherein said apparatus is a surveillance device attached adjacent to an eye-hole of each location intended to be placed under surveillance, for capturing visitors'/possible intruders' facial images and for preserving those with a proper date and time stamp in the off-site storage unit.

18. A process for automated monitoring of facial images for surveillance purposes in a monitoring apparatus, comprising:
continuously capturing videos using a video capturing device;
analyzing each frame of the captured video frame by frame using a Haar classifier image calculation mechanism for identifying a captured frame including a human face image,
when the captured frame including the human face image is identified, generating a cropped and normalized version of the captured frame by removing portions of the frame other than the human facial image and resizing the version of the frame, such that the human facial image conforms to a predetermined size;
capturing date and time information of the captured frame including the human facial image; and
after the cropped and normalized version of the frame is generated and when network connectivity is present, automatically and immediately transmitting the cropped and normalized version of the frame and the captured date and time information to a predefined off site storage unit operating in an unattended mode, using a wi-fi dongle or network cable for investigation and analysis instantaneously or as and when required,
wherein the video capture device is positioned within a cabinet formed from a conductive material comprising a top portion, a bottom portion, side portions extending therebetween, and a first opening extending through one of the side portions, and
wherein the video capturing device comprises a lens mounted to and covering the first opening of the cabinet.

19. The process for automated monitoring of facial images as claimed in claim 18, wherein the application software, when executed by at least one processing unit of the monitoring apparatus, initiates headless start up of the apparatus.

* * * * *

UNITED STATES PATENT AND TRADEMARK OFFICE
CERTIFICATE OF CORRECTION

PATENT NO. : 10,592,727 B2  
APPLICATION NO. : 14/691771  
DATED : March 17, 2020  
INVENTOR(S) : Debasis Mazumdar et al.

Page 1 of 1

It is certified that error appears in the above-identified patent and that said Letters Patent is hereby corrected as shown below:

In the Claims

Column 8, Line 45, Claim 4, delete "slats" and insert -- slots --

Column 8, Line 48, Claim 4, delete "mare" and insert -- more --

Signed and Sealed this  
Twenty-sixth Day of May, 2020

Andrei Iancu  
*Director of the United States Patent and Trademark Office*